United States Patent Office 2,871,281
Patented Jan. 27, 1959

2,871,281

ALKALINE STORAGE BATTERY WITH NEGATIVE IRON ELECTRODE

Joseph D. Moulton, West Orange, and William R. Miller, Verona, N. J., assignors, by mesne assignments, to McGraw-Edison Company, Elgin, Ill., a corporation of Delaware No Drawing. Application November 16, 1956
Serial No. 622,523

5 Claims. (Cl. 136—25)

This invention relates to improvements in storage batteries of the type which use an alkaline electrolyte and a negative "iron electrode," the term "iron electrode" being herein used to mean an electrode whose active material is electrolytically-active iron—i. e., initially a mixture of metallic iron and ferrous oxide which when formed is essentially finely-divided metallic iron.

The invention has special practical application to the well-known commercial nickel-iron-alkaline storage battery comprising an alkaline electrolyte, a negative iron electrode and a positive electrode whose active material is nickel oxide. An object of the invention is to improve markedly the life and performance of such battery by adding to the battery, particularly to the active material of the negative iron electrode, a sulphur-bearing material which will result in the negative active material having a sulphide content substantially in excess of that which has heretofore been considered permissible. It is to be understood, however, that no unnecessary limitation of the invention to positive electrodes of nickel oxide is intended because the invention is operable as well with other positive electrodes.

A small amount of ferrous sulphide is present as an impurity in the usual iron active material. For instance, in the manufacture of iron active material, ferrous sulphate is roasted to form ferric oxide, the oxide is then reduced by hydrogen to metallic iron, and the iron is then moistened and partially oxidized by heat to form a mix of metallic iron and ferrous oxide. A small amount of iron sulphate (i. e., ferric and/or ferrous sulphate) is carried along through the roasting operation and is reduced to ferrous sulphide during the reducing operation. It has been known that the presence of a minute amount of ferrous sulphide in the negative active material is necessary to activate the iron so that the battery will have satisfactory initial capacity. A sulphide content equivalent to about .015% S by weight of the iron has been sufficient to accomplish this initial activation. A sulphide content in excess of about .03% S has however been considered to be very undesirable and, as a consequence, rigid process controls have been employed in the manufacturing process to keep the sulphide content below such limiting value. Typically, the amount of ferrous sulphide in the finished iron mix has averaged about .02% in terms of sulphur content.

It has been found according to the invention that the deliberate addition of a sulphur-bearing material which will result in the iron active material having a sulphide content of a higher value, typically .05% to .1% S by weight of the iron, has the unexpected beneficial effect of increasing the life of the negative iron electrode and of improving the over-all performance of the battery. For example, tests on both miniature and standard cells have shown that the life of the negative electrode is increased at least five times by our invention. Further, when the negative electrodes of the present invention are used against positive plates to form the latter, they last of the order of four times longer than do the commercial negative electrodes as heretofore employed. Also, batteries using our improved negative iron electrodes are capable of withstanding greater abusive treatment such as in the way of excessive overcharging and overdischarging without undergoing loss in electrical capacity.

For a better understanding of the invention the manufacturing steps typically employed in producing iron active material may be herein more fully described. A high-purity iron is dissolved in sulphuric acid to form a ferrous sulphate solution from which ferrous sulphate crystals are separated by centrifuging. These crystals are then partially dehydrated as by a rotary dryer after which a charge thereof is introduced into a muffle furnace to undergo a roasting operation typically at a temperature of about 1500° F. For uniform treatment, the charge is stirred occasionally as by raking or hoeing. By this roasting operation the crystals are decomposed with evolution of fumes of sulphuric dioxide and trioxide to form ferric oxide; however, some iron sulphate is also formed and retained in the ferric oxide as aforementioned. The ferric oxide is then placed in large vats and a weak solution of sulphuric acid is percolated therethrough to remove impurities. Next, the ferric oxide is water-washed until tests indicate a substantially complete removal of all of the sulphuric acid. The ferric oxide is next centrifuged to remove excess water and is then subjected to heat as to a temperature of about 300° to 500° F. to fully dry the oxide. The ferric oxide is thereafter reduced by hydrogen at an elevated temperature of about 1000° to 1500° F. to produce metallic iron with some carry-through of ferrous sulphide formed by reduction of the iron sulphate in the ferric oxide. Then, as aforestated, the iron is moistened and partially oxidized by heat to form a mix of metallic iron and ferrous oxide. Such mix is then finely ground to form the final product having a sulphide content of about 0.2% S by weight of the iron.

The foregoing manufacturing method may be modified in one or another respect any one of which is effective to increase the sulphide content of the iron active material by the desired amount according to the invention. For example, the time duration of the roasting operation may be reduced or the frequency of stirring may be decreased to cause the oxide to have an increased amount of iron sulphate. Alternatively, the washing operation may be discontinued at an early stage to increase the amount of sulphate left in the ferric oxide. Still alternatively, any suitable sulphur-bearing material may be introduced into the ferric oxide during the centrifuging operation. For instance, after the excess water has been removed by centrifuging, the moist ferric oxide may be treated as by spraying while still in the centrifuge with a solution of ferrous sulphate or other soluble sulphur-bearing compound such as $(NH_4)_2SO_4$, $Na_2SO_4$, or $K_2SO_4$. The ferric oxide is then centrifuged again to remove excess solution. In the ensuing reducing operation the sulphur-bearing solution reacts with the iron to form ferrous sulphide. The final sulphide content can be varied by varying the concentration of the sulphur-bearing material.

The sulphide addition to the negative active material may also be carried out in the cell (1) by absorbing or dissolving hydrogen sulphide gas in the alkaline electrolyte until the desired sulphide concentration is obtained, or (2) by dissolving sodium sulphide crystals in the alkaline electrolyte. Of these two methods the latter is preferred because it is the more convenient to carry out. As a typical example of the latter, 38 g. of $Na_2S.9H_2O$ is added to 200 ml. of electrolyte to provide a solution having a sodium sulphide content equivalent to about .025 g. S per ml. A quantity of this sulphide electrolyte in an amount calculated to provide a sulphide content at least equivalent to .03% to .1% S by weight of the negative active material is then added to the cell. For example, about 20 ml. of this sulphide electrolyte equivalent to about .5 g. of sulphur is added to a cell containing about 500 g. of negative active material. Before adding the sulphide electrolyte, the cell is first discharged to about 1 volt and then short-circuited for several hours. The electrolyte is then drained from the cell and a new or the same electrolyte is modified to have the desired sulphide electrolyte mixed therewith and is then added to the cell. Thereafter, the cell is put immediately on charge and cycled several times according to the usual practice. By this method ferrous sulphide is formed through the negative active material in an amount providing a sulphur content at least greater than .03% by weight of the iron active material in accordance with the invention. It should be noted that this method of adding the sulphide to the negative active material may be employed not only in the original construction and preparation of commercial cells, but may be used effectively for activating or regenerating the negative iron electrodes of used cells which have become inoperative due to unusual or severe service conditions.

A purely mechanical method of incorporating the ferrous sulphide into the iron active material is however preferred because it is very simple and easy to control, and may be applied to any iron active material by the simple expedient of mixing or blending a finely-divided sulphur-bearing material with the powdered iron mix. The sulphur-bearing material may, for example, be elemental sulphur, ferrous sulphide or mercuric sulphide; however, ferrous sulphide of the form known as Technical Fused Ferrous Sulphide in lump or granular form is preferred. This sulphur-bearing material is finely ground as by a Mikro-pulverizer to a fineness such that it will pass through a No. 325 screen. The amount of such sulphur-bearing material which is added is calculated to provide the final product with a sulphur content of the order of .05% to .1% by weight of the iron. Preferably, this sulphur-bearing material is first mixed with a small amount of iron mix and the same is then added to the remainder of the iron mix to assure a thorough blending of the sulphur material through the mix. The mixture so formed is then loaded in the pockets of the iron electrode to form a completed electrode ready for use.

It is believed that if elemental sulphur or a sulphide-bearing material other than ferrous sulphide is used, there will take place a reaction between such material and a portion of the iron mix to form ferrous sulphide during the operation of the battery, it being the belief that the most effective form of the sulphur for purposes of the invention is that of ferrous sulphide. However, no unnecessary limitation of the invention to ferrous sulphide is intended.

The detailed description of our invention is to be considered as illustrative and not necessarily limitative since our invention is subject to changes and modifications without departure from the scope thereof, which we endeavor to express according to the following claims.

We claim:

1. In a storage battery: a positive electrode, an alkaline electrolyte, and a negative electrode the active material of which consists essentially of electrolytically-active iron and ferrous sulphide in an amount equivalent from at least .03% to about .1% sulphur in the form of sulphide by weight of the iron.

2. In a storage battery: a positive electrode, an alkaline electrolyte, and a negative electrode the active material of which consists essentially of an active iron mix including ferrous oxide and a finely-divided substance selected from the group consisting of ferrous sulphide and of sulphur-bearing materials which will in an alkaline electrolyte form ferrous sulphide during the charge-discharge cycling of the battery, said ferrous sulphide being present in an amount providing from about .03% to about .1% sulphur in the form of sulphide by weight of the iron mix.

3. A negative active material for an alkaline storage cell consisting essentially of an active iron material including ferrous oxide and a substance selected from the group consisting of ferrous sulphide and of sulphur-bearing materials which will in an alkaline electrolyte form ferrous sulphide during charge-discharge cycling of the cell, said iron material and said substance being finely-divided and evenly mixed and said substance being present in an amount providing a ferrous sulphide content from about .03% to about .1% sulphur in the form of sulphide by weight of the iron material.

4. An alkaline battery comprising a positive electrode having an active material of nickel oxide, an alkaline electrolyte, and a negative electrode the active material of which consists essentialy of electrolytically-active iron and a finely-divided substance selected from the group consisting of ferrous sulphide and of sulphur-bearing materials which will in an alkaline electrolyte form ferrous sulphide during charge-discharge cycling of the battery, said substance being present in an amount to provide a ferrous sulphide content at least greater than .03% and not substantially greater than .1% sulphur in sulphide form by weight of the active material.

5. An alkaline battery comprising a positive electrode having an active material of nickel oxide, an alkaline electrolyte, a negative electrode including iron active material, and an alkali-soluble sulphur-bearing compound dissolved in the electrolyte and adapted to form ferrous sulphide in the iron active material during charge-discharge cycling of the battery, said sulphur-bearing material being present in an amount to provide a ferrous sulphide content at least greater than .03% and not substantially greater than .1% sulphur in sulphide form by weight of the iron active material in the negative electrode.

References Cited in the file of this patent
UNITED STATES PATENTS

| | | |
|---|---|---|
| 436,602 | Hollingshead | Sept. 16, 1890 |
| 678,722 | Edison | July 16, 1901 |
| 983,430 | Estelle | Feb. 7, 1911 |
| 2,588,170 | Smith | July 5, 1949 |

FOREIGN PATENTS

| | | |
|---|---|---|
| 3,711 | Great Britain | of 1907 |
| 143,327 | Great Britain | May 25, 1920 |